Jan. 30, 1951     C. H. SMITH     2,539,596

NUT GATHERER

Filed Nov. 28, 1947     2 Sheets—Sheet 1

CARL H. SMITH

Inventor

By McMorrow, Berman & Davidson
Attorneys

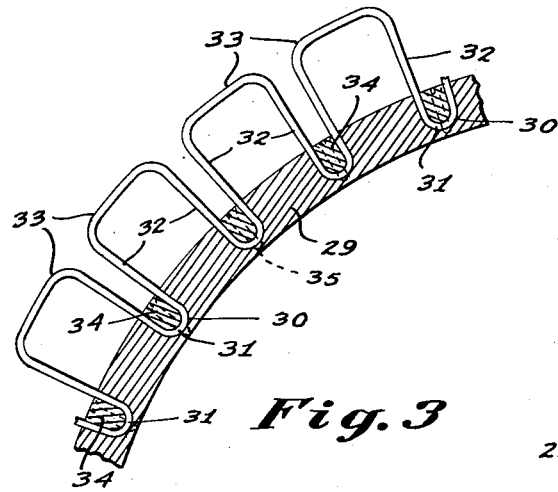
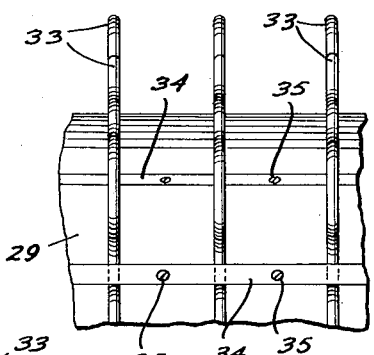
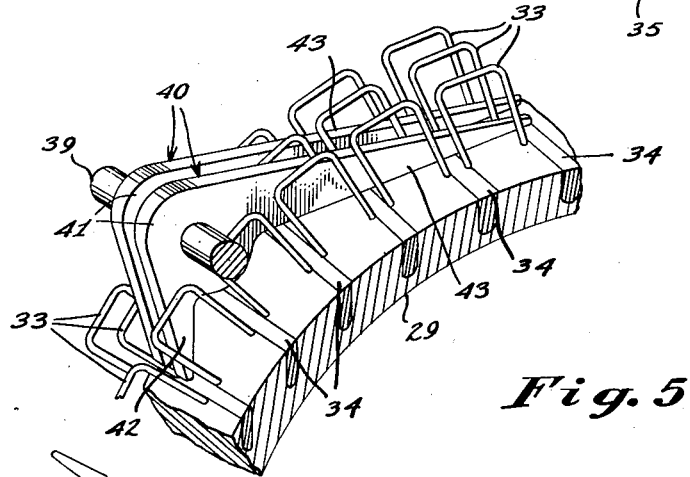
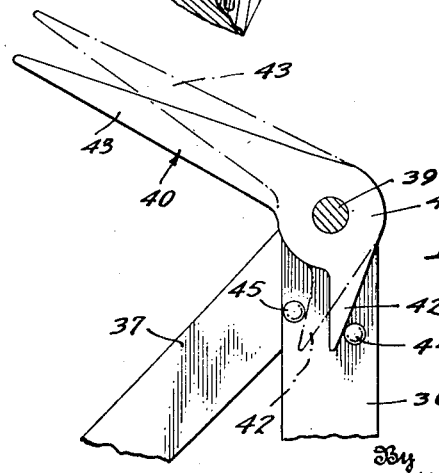

Patented Jan. 30, 1951

2,539,596

UNITED STATES PATENT OFFICE 2,539,596

NUT GATHERER

Carl H. Smith, Milner, Ga.

Application November 28, 1947, Serial No. 788,575

1 Claim. (Cl. 56—328)

My invention relates to a machine for gathering nuts such as pecans, and the like.

An important object of the invention is to provide a machine for gathering or harvesting pecans, such machine requiring but one operator, and being able to gather as many pecans as several hired hands.

A further object is to provide a machine to gather nuts which have dropped to the ground, the machine being pushed over the ground like a conventional lawn mower.

A still further object of the invention is to provide a machine of the above mentioned class which is simple, durable, reliable and efficient in operation, and relatively inexpensive to manufacture.

Other objects and advantages of the invention will be apparent during the course of the following description.

Figure 1:
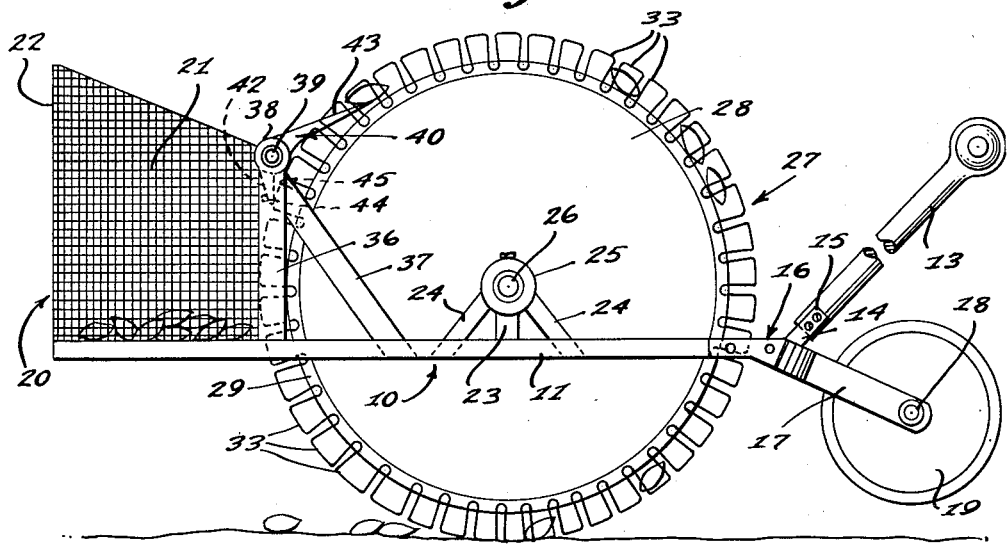
Figure 2:
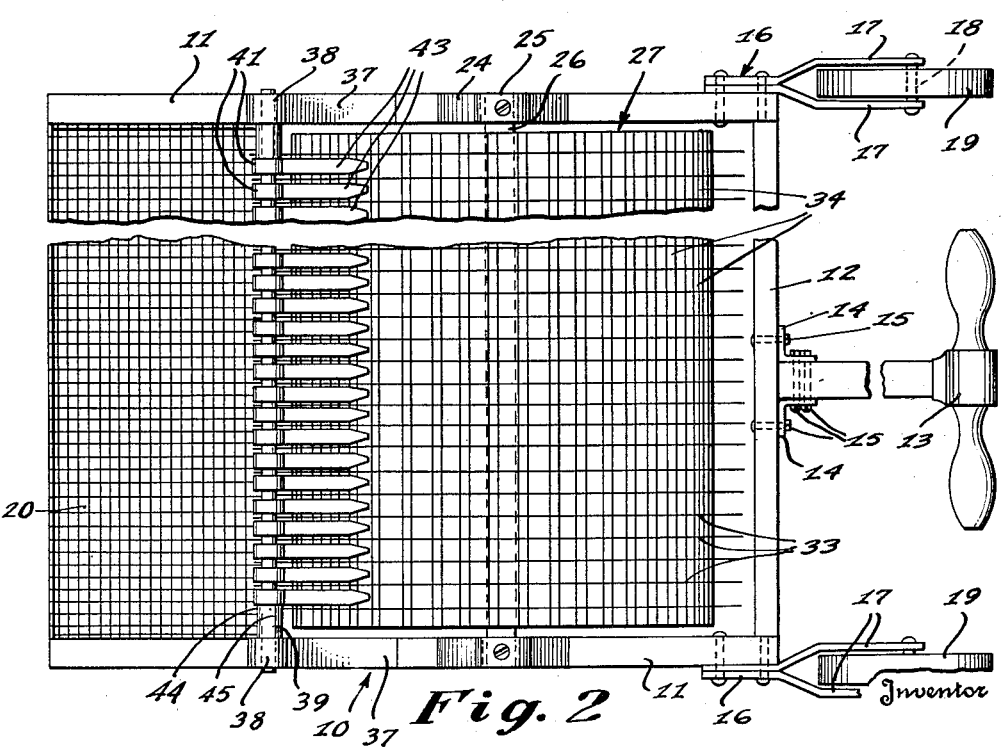

In the accompanying drawings, forming a part of this application, and in which like numerals are employed to designate like parts throughout the same, Figure 1 is a side elevation of the nut gathering machine embodying the invention, Figure 2 is a plan view of the same, part broken away, Figure 3 is an enlarged fragmentary vertical section through a portion of a gathering drum, Figure 4 is an enlarged fragmentary side elevation showing a portion of the gathering drum, Figure 5 is an enlarged fragmentary perspective view of ejector fingers and associated elements, and, Figure 6 is an enlarged fragmentary vertical section showing the ejector fingers in extreme positions.

In the drawings, where for the purpose of illustration is shown a preferred embodiment of the invention, the numeral 10 designates a horizontal V-shaped frame, comprising parallel longitudinal side rails 11, and a rear transverse member or rail 12, rigidly secured to side rails at their rear ends. Rigidly mounted upon the rear rail 12, at the longitudinal center of the same, is a rearwardly extending and upwardly inclined handle 13. This handle is attached to the rail 12 by means of angle brackets 14 and bolts 15, or the like. Rigidly secured to the side rails 11, at the rear ends of the same, are Y-shaped yokes 16, having rearwardly projecting downwardly inclined arms 17. The rear ends of the arms 17 carry pins or shafts 18, upon which are rotatably mounted wheels 19. Suitably permanently mounted upon the side rails 11, at their forward ends, is a generally rectangular basket 20, of wire mesh, or the like. The basket 20 has sides 21, the top edges of which are inclined upwardly toward the front of the basket. This construction provides a front side 22 for the basket, which is higher than the rear side thereof. The basket 20 extends for the entire lateral distance between the side rails 11.

Suitably rigidly mounted upon the side rails 11, near the longitudinal centers of the same are upstanding members or posts 23. These posts 23 are oppositely disposed, and project above the side rails. Diagonal braces 24 are arranged upon opposite sides of the posts 23, and the posts and diagonal braces support axially aligned bearings 25, within which is rotatably mounted a transverse horizontal axle or shaft 26. Rigidly mounted upon the shaft or axle 26, for rotation therewith, is a cylindrical nut gathering drum 27, having ends 28, and a continuous cylindrical wall 29. The shaft 26 is rigidly secured in openings in the drum ends 28. The outer periphery of the cylindrical wall 29 is provided with a plurality of parallel axial U-shaped grooves 30, and these grooves extend for the entire axial length of the drum 27, and are circumferentially equidistantly spaced thereon. Disposed in the grooves 30 are inner relatively small U-shaped loops or ends 31, formed by the radial arms 32 of relatively large resilient inverted generally U-shaped members or spring loops 33. The loops 31 and 33 are formed from continuous strands of spring steel wire, or the like. The loops 33 project radially beyond the wall 29, and are arranged in circumferential rows which are equidistantly spaced axially, with respect to the drum 27. The arrangement is such that the loops 33 in each circumferential row are adjacent to the loops 33 of the next row. The loops 33 are resilient, and such loops in adjacent circumferential rows are adapted to coact to resiliently hold an object, such as a pecan between them. The loops 33 are secured in place by means of longitudinal strips 34, which engage upon the inner loops 31. The strips 34 enter the grooves 30, and their outer surfaces are flush with the outer periphery of the wall 29. The strips are secured in place in the grooves 30, by means of longitudinally spaced screws 35, which pass through the strips and engage in the wall 29. The outer ends of the loops 33 form a substantially continuous rolling surface to roll upon the ground. The gathering drum 27 is of such diameter, that the top of the drum is at substantially the same elevation as the top of the basket 20. The lower ground engaging side of the drum extends below the side rails 11 for a substantial distance, and when the frame 10 is horizontal, the lower side of the drum is below the wheels 19, which do not then engage the ground. The handle 13 projects rearwardly of and above the drum 27 for a substantial distance.

Mounted upon the side rails 11, adjacent to the rear side of the basket 20, and extending above the side rails to an elevation near the top of the basket, are opposite uprights 36. Diagonal braces 37 are rigidly connected to the top ends of the uprights 36 and with the side rails 11. The uprights carry axially aligned bearings 38, within which is rotatably mounted a horizontal shaft 39. Rigidly mounted upon the shaft 39, are a plurality of pecan ejectors 40. The ejectors 40 are disposed between the circumferential rows of loops 33. Each ejector 40 includes a hub portion 41 to receive the shaft 39, and a short tapered depending extension 42. Each ejector also includes a rearwardly extending ejector finger 43, which tapers toward its rear end, and is disposed close to the outer periphery of the wall 29. Stop pins 44 and 45 are provided near one end of the shaft 39 and these pins are rigidly secured to the adjacent upright 36. The stop pins 44 and 45 extend axially of the shaft 39 for a sufficient distance to be adjacent to the extension 42 of the first ejector 40. The pins 44 and 45 are adapted to engage the extension 42 of the first ejector, to limit the rotation in both directions of all of the ejectors 40.

The operation of the machine is as follows.

The pecans to be gathered are on the ground, as shown in Figure 1. The machine is pushed forwardly like a lawn mower. The gathering drum 27 engages the ground and rolls thereon, and the wheels 19 need not touch the ground during the gathering operation. As the drum 27 rolls over the pecans, the same become wedged in between the spring loops 33 of adjacent circumferential rows of such loops. These loops 33, due to their resiliency, hold the nuts therebetween, and carry them around with the drum, as the same rolls forwardly. When the pecans between the spring loops 33 reach the fingers 43, the rear tapered ends of such fingers engage beneath the pecans and eject them from between the loops, see Figures 1 and 5. The ejected nuts then tumble into the basket 20. Obviously, the drum 27 can be constructed in any desired length found to be practical.

When it is desired to move the machine from tree to tree, or to turn it around, the operator presses down upon the handle 13 and the wheels 19 will engage the ground. As the handle 13 is further depressed, the drum 27 will be elevated and the machine can be rolled along or pivoted around on the wheels 19.

It is to be understood that the form of my invention herewith shown and described is to be taken as a preferred example of the same, and that various changes in the shape, size and arrangement of parts may be resorted to, without departing from the spirit of the invention, or the scope of the subjoined claim.

Having thus described the invention, I claim:

In a nut harvester, a substantially cylindrical drum having an axle to roll upon the ground and provided in its periphery with a plurality of circumferentially spaced substantially straight grooves parallel and spaced from said axle, spaced rows of resilient inverted generally U-shaped loops extending radially of the periphery of the drum, the loops in each row being formed from a unitary strand of wire and being spaced apart circumferentially, the loops of each row including substantially radial arms which extend radially into the grooves adjacent to the side edges of the grooves, the inner ends of the radial arms of adjacent loops in the rows being integrally connected for forming substantially U-shaped ends disposed in the bottoms of the grooves and extending transversely of the grooves, and elongated attaching strips secured within the grooves between the radial arms and seated upon the U-shaped ends for clamping them in place within the grooves.

CARL H. SMITH.

REFERENCES CITED

The following references are of record in the file of this patent:

UNITED STATES PATENTS

| Number | Name | Date |
| --- | --- | --- |
| 62,623 | Frantz | Mar. 5, 1867 |
| 675,547 | Kramer | June 4, 1901 |
| 1,565,162 | King | Dec. 8, 1925 |
| 1,859,980 | Mueller | May 24, 1932 |
| 2,413,679 | Binder | Jan. 7, 1947 |

FOREIGN PATENTS

| Number | Country | Date |
| --- | --- | --- |
| 85,340 | Switzerland | June 1, 1920 |